(12) United States Patent
Costin

(10) Patent No.: US 8,025,073 B2
(45) Date of Patent: Sep. 27, 2011

(54) INCLINE-RESPONSIVE VALVE

(75) Inventor: Peter Sabin Costin, Avon, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 384 days.

(21) Appl. No.: 12/324,208

(22) Filed: Nov. 26, 2008

(65) Prior Publication Data
US 2009/0133757 A1 May 28, 2009

Related U.S. Application Data

(60) Provisional application No. 60/990,417, filed on Nov. 27, 2007.

(51) Int. Cl.
*F16K 17/36* (2006.01)
(52) U.S. Cl. ..................... 137/45; 137/625.23
(58) Field of Classification Search ............... 137/45, 137/38, 625.23; 280/5.508; 182/2.2, 2.1; 248/550
See application file for complete search history.

(56) References Cited

U.S. PATENT DOCUMENTS

| | | | |
|---|---|---|---|
| 369,750 A | 9/1887 | Spranger | |
| 2,544,438 A | 3/1951 | Allgeo | |
| 2,611,487 A * | 9/1952 | Stevenson | 137/45 |
| 2,684,254 A * | 7/1954 | Goss | 137/45 |
| 2,920,636 A | 1/1960 | Gassner | |
| 2,934,078 A | 4/1960 | Gurries et al. | |
| 3,083,469 A | 4/1963 | Herbst | |
| 3,341,165 A | 9/1967 | Taylor | |
| 3,386,303 A | 6/1968 | Curlett | |
| 3,431,997 A | 3/1969 | Kavthekar et al. | |
| 3,590,948 A | 7/1971 | Milner, Jr. | |
| 3,791,484 A | 2/1974 | Harrison | |
| 3,860,088 A | 1/1975 | Gallatly | |
| 3,893,540 A | 7/1975 | Beucher | |
| 4,003,405 A | 1/1977 | Hayes et al. | |
| 4,252,162 A | 2/1981 | Le Devehat | |
| 4,430,804 A | 2/1984 | Nordgren et al. | |
| 4,843,725 A | 7/1989 | Harris | |
| 4,858,723 A | 8/1989 | Holmes et al. | |
| 5,106,120 A * | 4/1992 | Di Maria | 137/625.23 |
| 5,286,053 A | 2/1994 | Lenzen et al. | |
| 5,372,204 A * | 12/1994 | Schiess | 137/45 |
| 5,609,352 A * | 3/1997 | Di Maria | 137/45 |
| 5,944,138 A | 8/1999 | Vollmer et al. | |
| 6,470,905 B2 | 10/2002 | Im et al. | |
| 7,082,744 B2 | 8/2006 | Briesemeister et al. | |

FOREIGN PATENT DOCUMENTS

JP 2002321514 11/2002

* cited by examiner

*Primary Examiner* — Kevin L Lee
(74) *Attorney, Agent, or Firm* — Renner, Otto, Boisselle & Sklar, LLP

(57) ABSTRACT

A valve (100) includes a valve body (300), a spool assembly (600), and a pendulum assembly (700). The valve body (300) is adapted for fixed attachment to a mounting surface (260) having an orientation corresponding to the incline of a supporting surface (210. The spool assembly (600) comprises a spool (610) pivotally mounted within the valve body (300), and the pendulum assembly (700) pivots the spool (610) in gravitational response to the orientation of the valve body (300). The valve body (300), the spool assembly (600), and/or the pendulum assembly (700) include one or more elements for adjusting flow symmetry between the LIO flowpaths and the GIO flowpaths.

20 Claims, 12 Drawing Sheets

INCLINE-RESPONSIVE VALVE

RELATED APPLICATION

This application claims priority under 35 U.S.C. §119 (e) to U.S. Provisional Patent Application No. 60/990,417 filed on Nov. 27, 2007, the entire disclosure of which is hereby incorporated by reference. If incorporated-by-reference subject matter is inconsistent with subject matter expressly set forth in the written specification (and/or the drawings) of the present disclosure, the present disclosure governs to the extent necessary to eliminate indefiniteness and/or clarity-lacking issues.

FIELD

A valve that is responsive to the incline of a supporting surface on which a subject structure is supported.

BACKGROUND

Agricultural, construction, utility-repair, military and other types of equipment are often required to travel over inclined supporting surfaces oriented at an incline. This equipment sometimes comprises a structure that preferably (or perhaps necessarily) should be compensated for the non-levelness of the supporting surface. This compensation can be accomplished by, for example, an actuator and valve that supplies control fluid to the actuator in response to the incline of the supporting surface (i.e., an incline-responsive valve).

An incline-responsive valve can comprise a valve body, a spool assembly, and a pendulum assembly. The valve body is fixed to a mounting surface having an orientation corresponding to the incline of the supporting surface and the spool assembly includes a spool pivotally mounted within the valve body. A pendulum assembly pivots the spool in gravitational response to the orientation of the valve body to thereby situate the spool relative to the valve body among an IO (intended optimum) position, sequential LIO (less than intended optimum) positions that define enlarging LIO flowpaths, and sequential GIO (greater than intended optimum) positions that define enlarging GIO flowpaths.

SUMMARY

An incline-response valve is provided wherein flow-symmetry adjustments can be made without the refabrication of flow-dictating parts (e.g., valve body, spool). In this manner, manufacturing errors can be forgiven and accurate valve performance can be achieved without tightening feature tolerances and/or automatically scraping imperfect parts. These and other features of the valve and/or the flow-symmetry-adjusting means are fully described and particularly pointed out in the claims. The following description and drawings set forth in detail certain illustrative embodiments, these embodiments being indicative of but a few of the various ways in which the principles may be employed.

DRAWINGS

FIGS. 4A-4J are schematic illustrations of valve body parts and flow-symmetry-adjusting means integrated thereinto.

DESCRIPTION

Figure 1A:
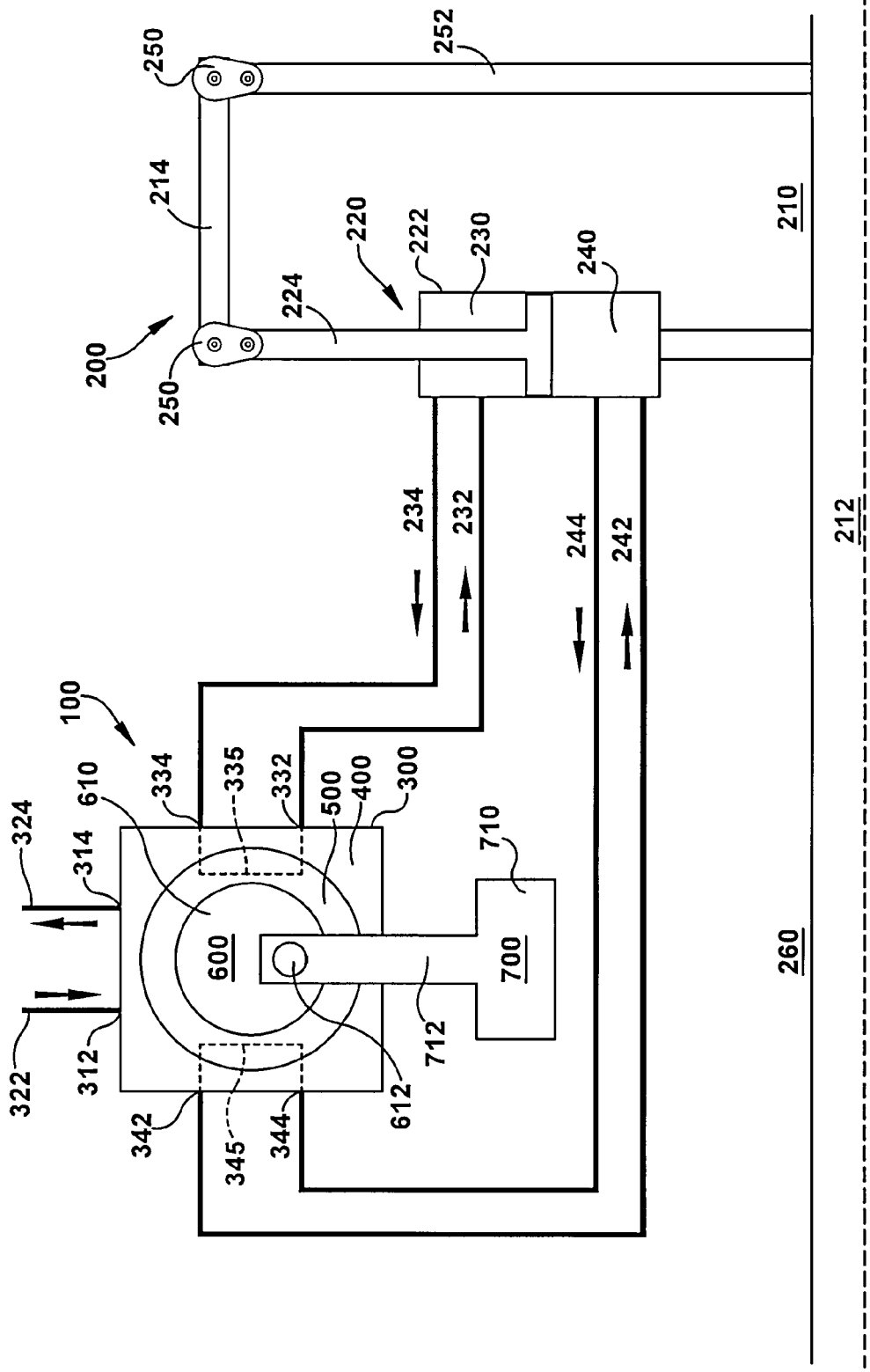
FIGS. 1A-1C are schematic diagrams of an incline-responsive valve being used in conjunction with equipment supported on supporting surface, the supporting surface being substantially horizontal in FIG. 1A (i.e., 0° incline angle), downhill in FIG. 1B (i.e., negative incline angle), and uphill in FIG. 1C (i.e., positive incline angle).

Referring now to the drawings, and initially to the first set of figures (FIGS. 1A-1C), a valve 100 is shown being used in conjunction with equipment 200. The equipment 200 can be, for example, construction machinery, farming apparatus, utility-repair appliances, military contraptions, general-transportation vehicles, etc. The equipment 200 is expected to travel over a supporting surface 210 (e.g., wreckage sites, fields, roads, battle grounds, etc.) that will may be at a positive or negative incline relative to a horizontal reference line 212.

Figure 1B:
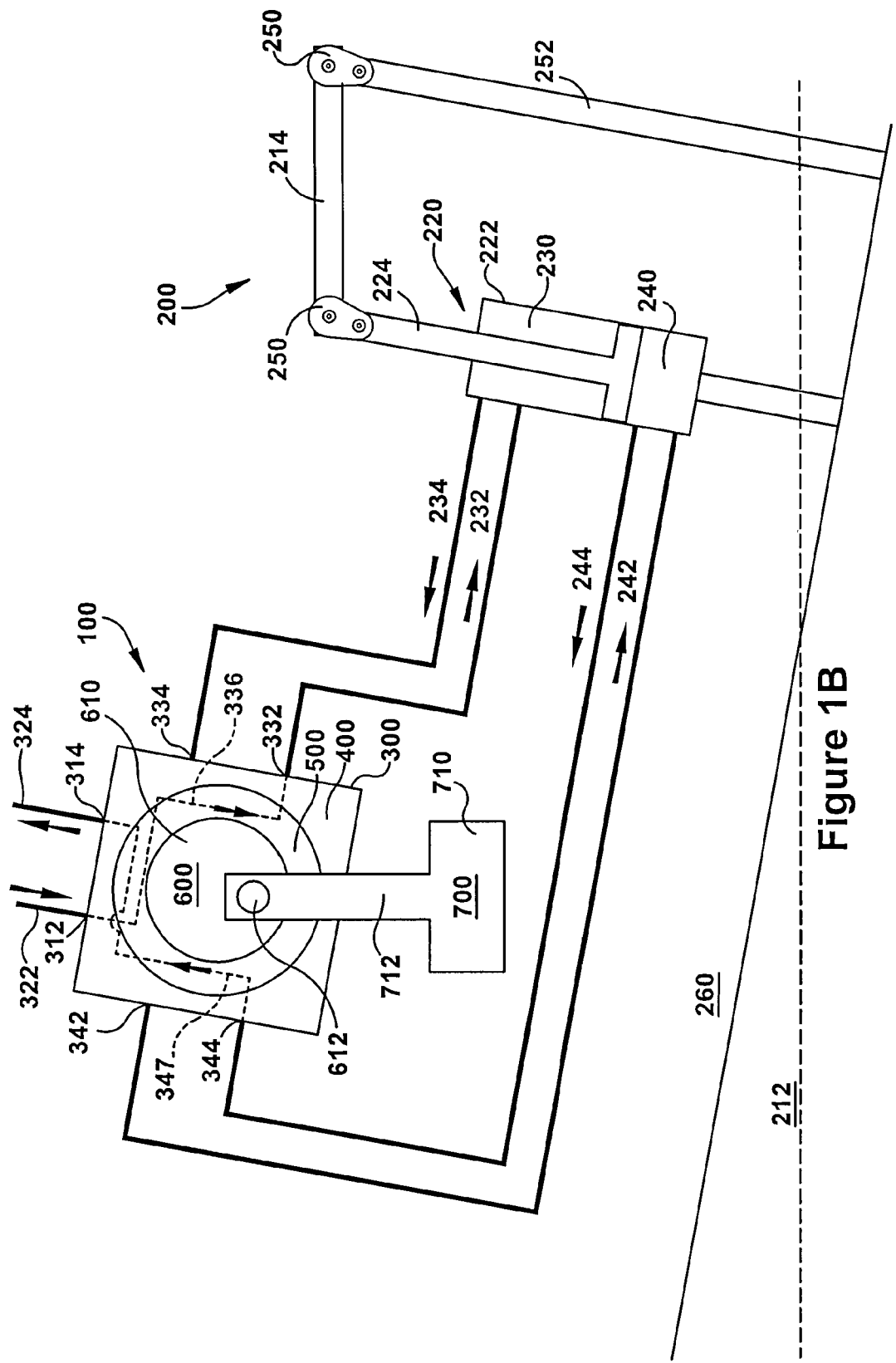
Figure 1C:
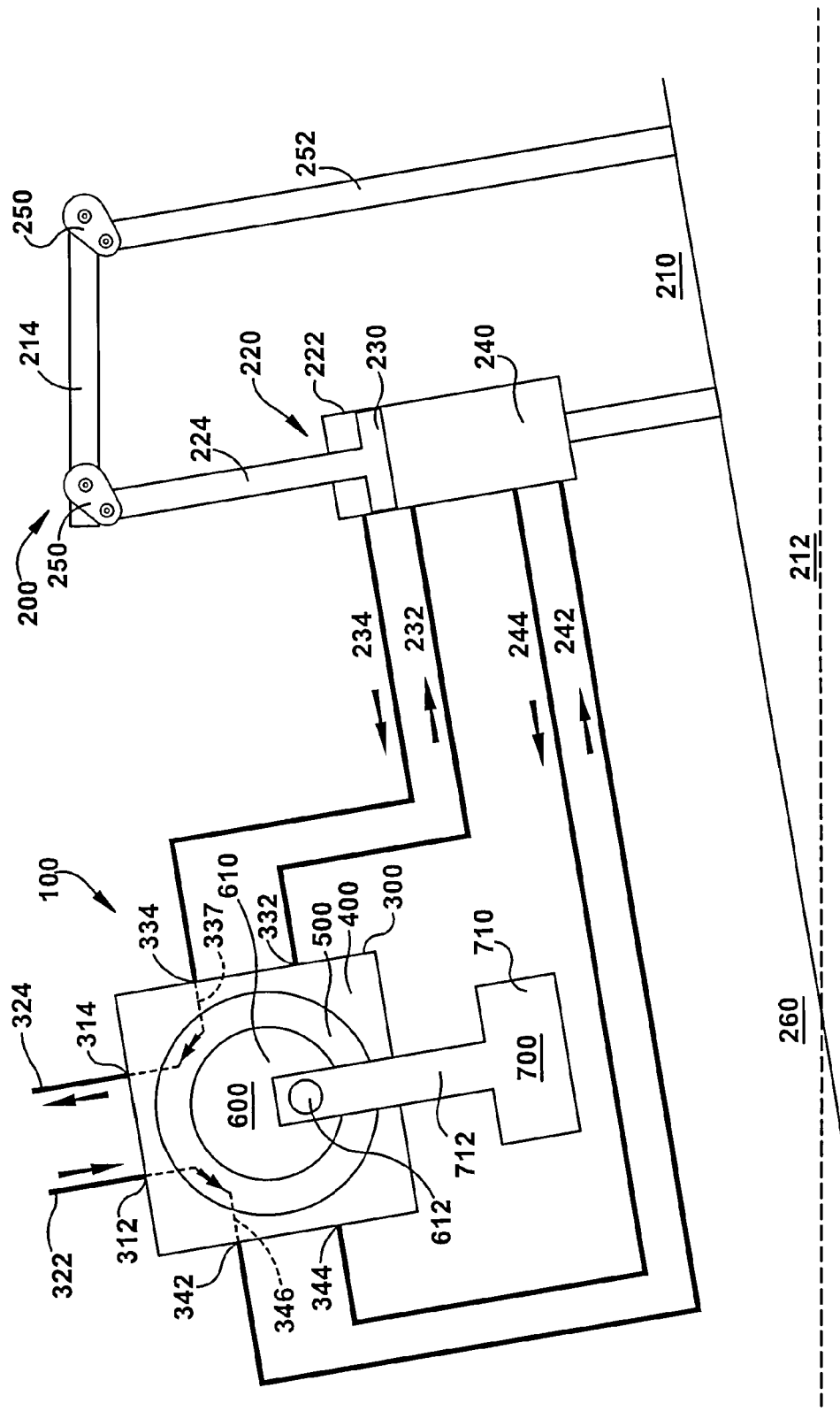

In FIG. 1A, the level supporting surface 210 is at incline angle of 0° relative to the horizontal reference line 212 (e.g., the supporting surface 210 is substantially horizontal). In FIG. 1B, the downhill supporting surface 210 is at a lesser incline angle (e.g., −10°) relative to the horizontal reference line 212. And in FIG. 1C, the uphill supporting surface 210 is at a greater incline angle (e.g., +10°) relative to the horizontal reference line 212.

The equipment 200 comprises a subject structure 214 that preferably (or perhaps necessarily) should be compensated for non-zero inclines in the supporting surface 210. The subject structure 214 can be a work platform (e.g., an operator seat, an elevator floor, etc.) that is leveled to an intended orientation IO relative to the horizontal reference line 212, regardless of the incline of the supporting surface 210. Or the subject structure 214 can be instrumentation (e.g., acceleration sensors, velocity meters, level indicators) that requires correction when not at an intended orientation IO. In most (but not necessarily all) cases, the intended orientation IO will be horizontal and thus have an incline angle of 0° relative to the reference line 212.

The illustrated equipment 200 includes an actuator 220 for leveling the subject structure 214 (e.g., a work platform) when the supporting surface 210 is at a non-zero incline. The actuator 220 can include, for example, a cylinder 222, and a piston 224 reciprocally movable therewithin. The piston 224 divides the cylinder 222 into an LIO side 230 (having an intake line 232 and a discharge line 234) and a GIO side 240 (having an intake line 242 and a discharge line 244).

The piston 224 is operably attached to an edge of the subject structure 214 for selective movement thereof. Linkage and/or levers 250 can be used for the attachment of the piston 224, and another leg support 252, to the subject structure 214. When the piston 224 is retracted (FIG. 1B), the piston-attached end of the subject structure 214 is lowered to the same height as its leg-supported end. When the piston 224 is extended (FIG. 1C), the structure's piston-attached end is raised so as to be level with its leg-supported end.

The equipment 200 further comprises a mounting surface 260 having an orientation corresponding to the incline of the supporting surface 210. The mounting surface 260 is located on the equipment 200 so as to move with the subject structure 214 during incline compensation. The mounting surface 260 can be (but need not be) a vertical ledge located on an impact-shielded region of the equipment 200.

The valve 100 comprises a valve body 300 fixedly attached to a mounting surface 260, whereby it assumes an orientation corresponding to the incline of the supporting surface 210. The valve body 300 has a control-fluid-supply entrance 312 and a control-fluid-return exit 314. The entrance 312 is connected by a supply line 322 to a fluid source (not shown) and the exit 314 is connected by a return line 324 to this source or another reservoir. The valve body 300 also has an LIO-intake outlet 332, an LIO-discharge inlet 334, a GIO-intake outlet 342, and a GIO-discharge inlet 344. The outlet 332 and the inlet 334 are connected to the cylinder's LIO side 230 by the intake line 232 and the discharge line 234, respectively. The outlet 340 and the inlet 342 are connected to the cylinder's GIO side 240 by the intake line 242 and the discharge line 244, respectively.

The valve body 300 can be constructed from a mounting part 400 (e.g., a plate) and a connecting part 500 (e.g., a housing). The mounting plate 400 can be fixedly attached to the mounting surface 260. The housing 500 can comprises a central spool cavity and can be fixedly attached to the mounting plate 400 around its periphery. The plate 400 and the housing 500 can individually or collectively define the entrance 312, the exit 314, the outlets 332 and 342, and the inlets 334 and 344.

The valve 100 additionally comprises a spool assembly 600 including a spool 610 and a rod 612 projecting outwardly therefrom. The spool 610 is pivotally mounted relative to the valve body 300 and positioned within the spool cavity of the housing 500. The valve body 300 and the spool 610 have precisely formed features that cooperate during operation of the valve to dictate fluid flow. These features can include, for example, circumferential openings, grooves, or passages that can connect to form flowpaths and radial fingers that can disconnect such flowpaths.

The valve 100 further comprises a pendulum assembly 700 including a ballast 710 and an arm 712. The upper end of the pendulum arm 712 is attached to the distal end of the spool rod 612 and the lower end of the pendulum arm 712 is attached to the ballast 710. The pendulum assembly 700 pivots the spool 610 in gravitational response to the orientation of the valve body 300, and thus in response to the incline of the supporting surface 210.

If the support surface 210 is not inclined (FIG. 1A), the pendulum assembly 700 situates the spool 610 in an IO position, whereat the fluid-supply entrance 312 is blocked from communication with the intake outlets 332 and 342. The discharge inlets 334 and 344 can also be blocked from communication with fluid-return exit 314. In this IO position, the valve body 300 and the spool 610 may define a cylinder-circulating flowpath 335 between the LIO outlet 332 and LIO inlet 334, and/or a cylinder-circulating flowpath 345 between the GIO outlet 342 and GIO inlet 344.

If the support surface 210 has a downhill incline (FIG. 1B), the pendulum assembly 700 situates the spool in an LIO position proportional to the magnitude of the incline. In an LIO position, the valve body 300 and the spool 610 define a LIO supply flowpath 336 from the control-fluid-supply entrance 312 to the LIO-intake outlet 332. They can also define a GIO return flowpath 347 from the GIO-discharge inlet 344 to the control-fluid return exit 314. Control fluid is thus introduced to the cylinder's LIO side 230 and removed from its GIO side 240. This retracts the piston 224 to level the subject structure 214.

If the support surface 210 has an uphill incline (FIG. 1C), the pendulum assembly 700 situates the spool 610 in a GIO position proportional to the incline magnitude. In such a position, the valve body 300 and the spool 610 define a GIO supply flowpath 346 from the control-fluid-supply entrance 312 to the GIO-intake outlet 342. An LIO return flowpath 337 can also be defined from the LIO-discharge inlet 334 to the control-fluid-return exit 314. Control fluid is thus introduced to the GIO side 240 of the cylinder 222 and removed from its LIO side 230, thereby retracting the piston 224 to level the subject structure 214.

The greater the magnitude of the incline, the further the spool 610 pivots away from the IO position, and the larger the flow capacity of the corresponding supply flowpath 336/346. Thus, for a range of downhill inclines (e.g., −2°, −4°, −6°, −8°, −10°), the spool 610 can be situated in sequential LIO positions that define enlarging LIO supply flowpaths. For a range of uphill inclines (e.g., ±2°, +4°, +6°, +8°, +10°), the spool 610 can be situated in sequential GIO positions that define enlarging GIO supply flowpaths.

Figure 2:
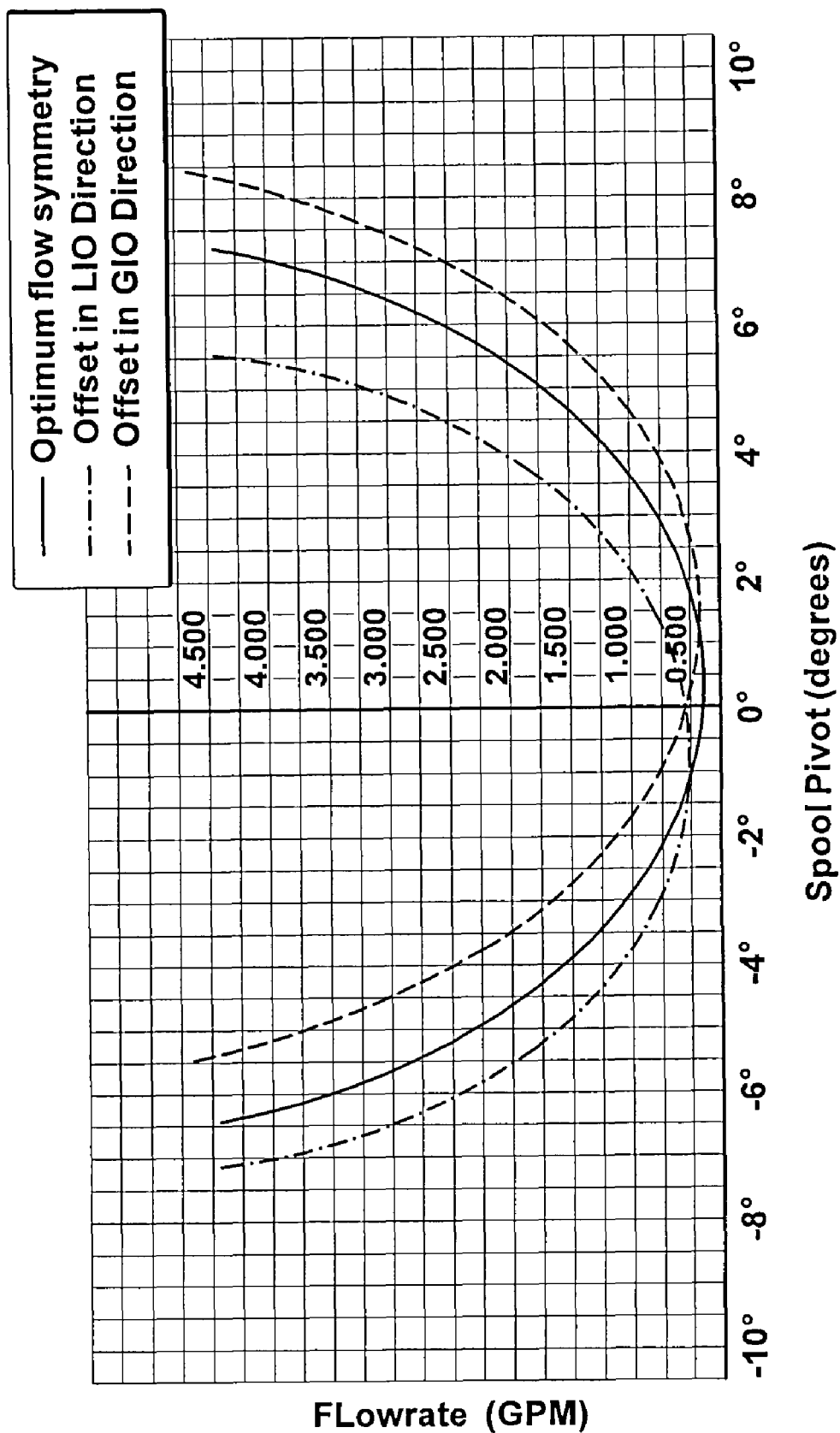
FIG. 2 is a graph showing some possible supply flowpath symmetry curves for the valve.
Figure 3B:
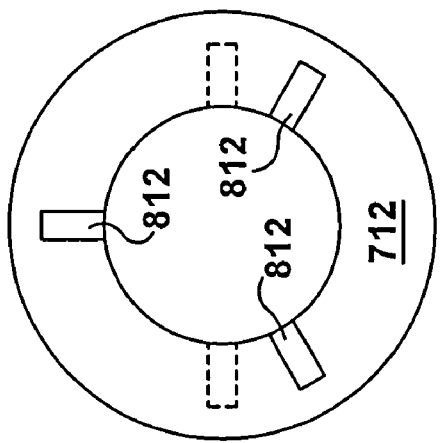
FIGS. 3A-3T are schematic illustrations of a spool assembly, a pendulum assembly, and flow-symmetry-adjusting means integrated thereinto.
Figure 3E:
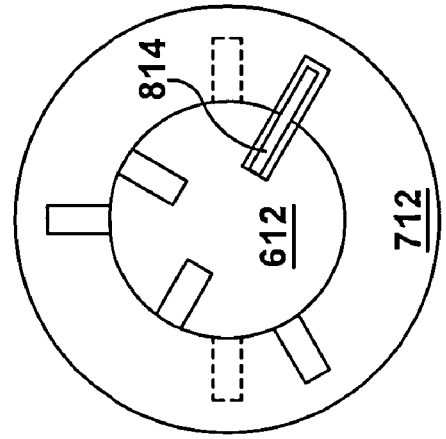
Figure 3A:
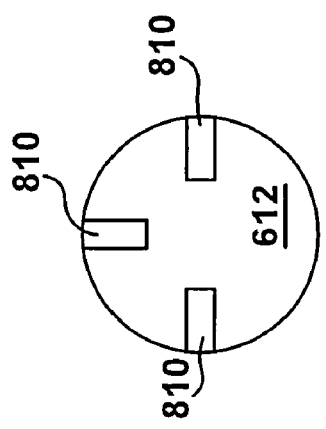
Figure 3D:
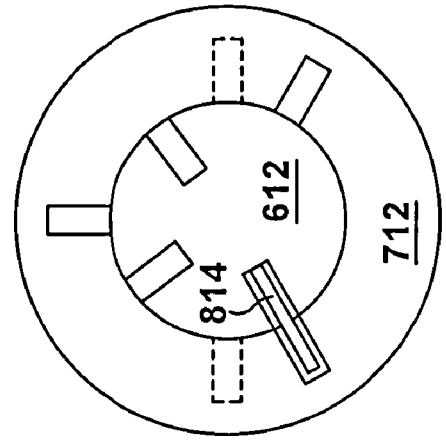
Figure 3C:
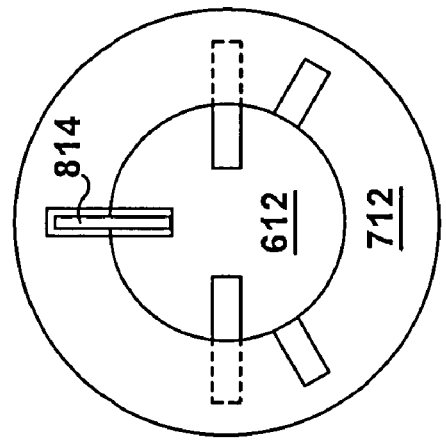
Figure 3J:
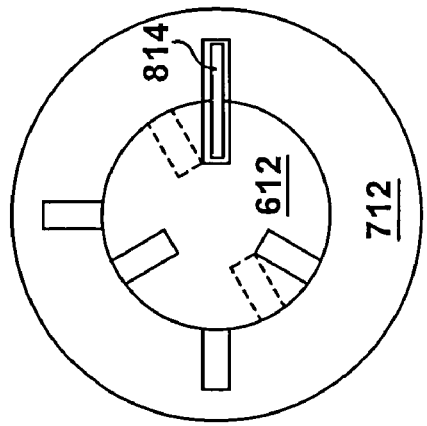
Figure 3G:
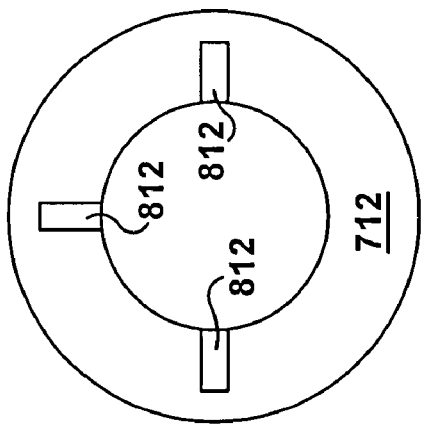
Figure 3I:
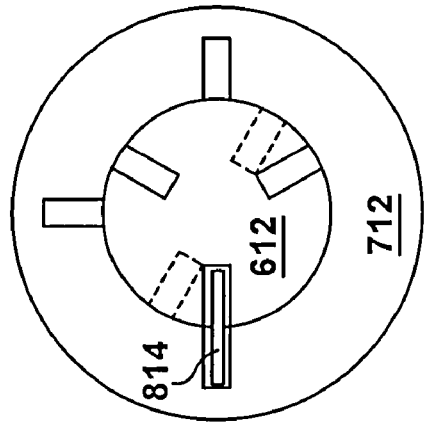
Figure 3F:
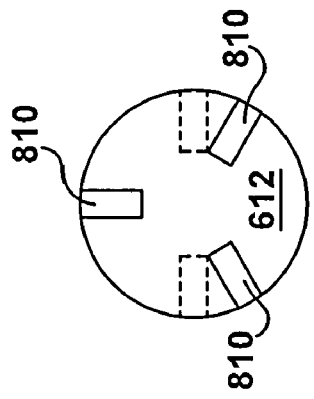
Figure 3H:
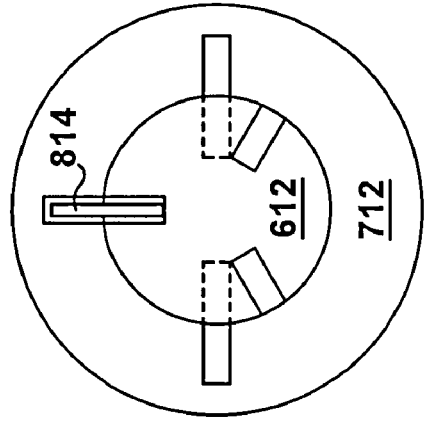
Figure 3L:
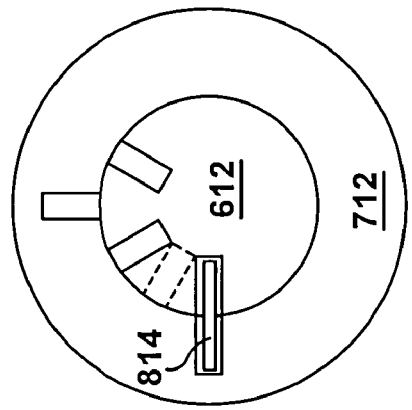
Figure 3O:
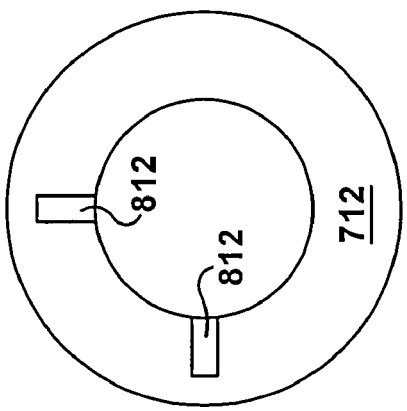
Figure 3K:
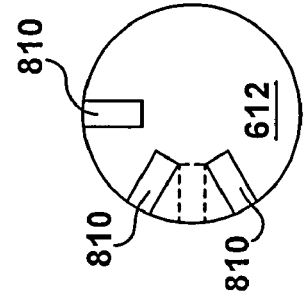
Figure 3N:
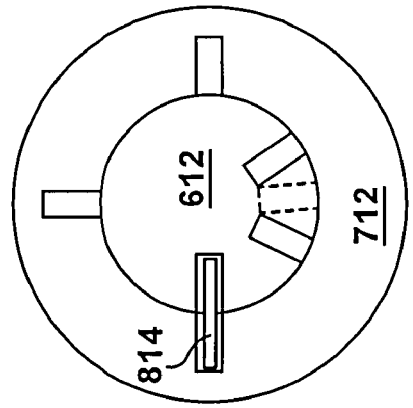
Figure 3M:
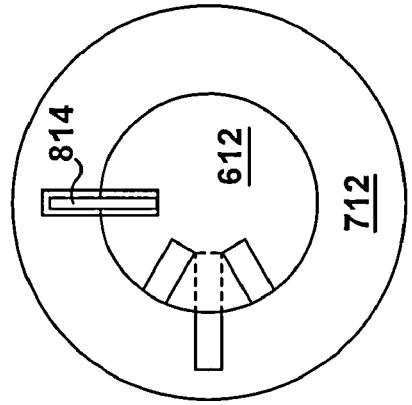
Figure 3Q:
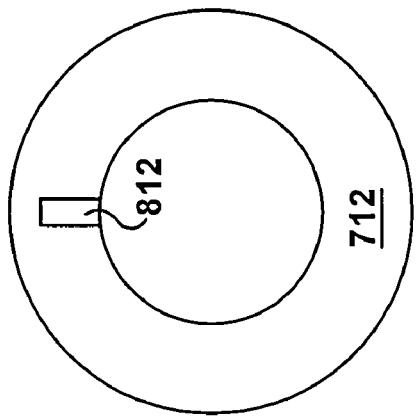
Figure 3P:
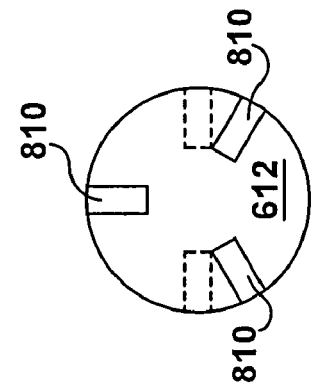
Figure 3T:
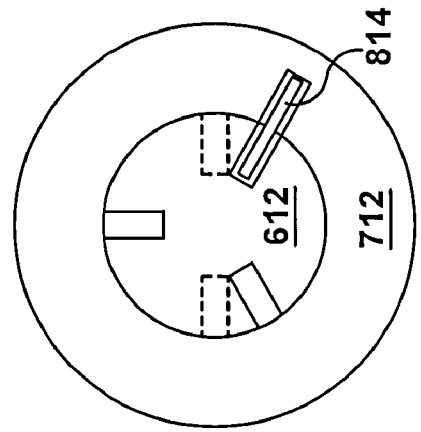
Figure 3S:
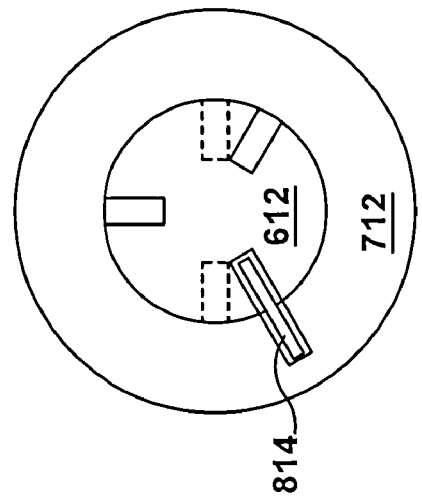
Figure 3R:
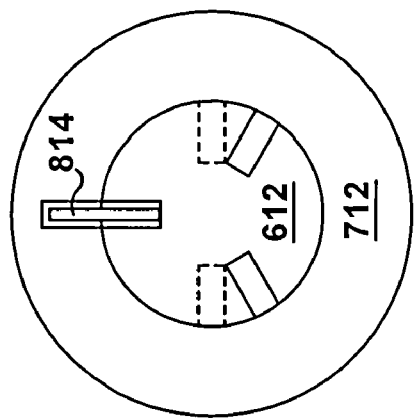
Figure 4B:
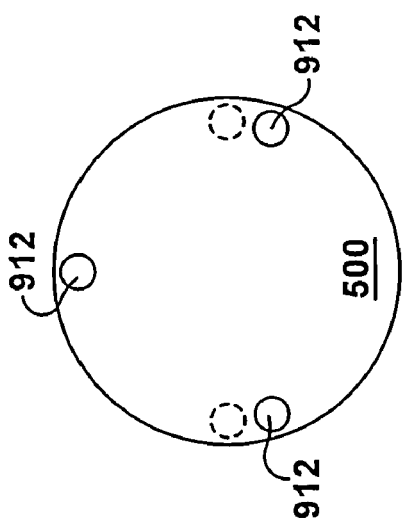
Figure 4E:
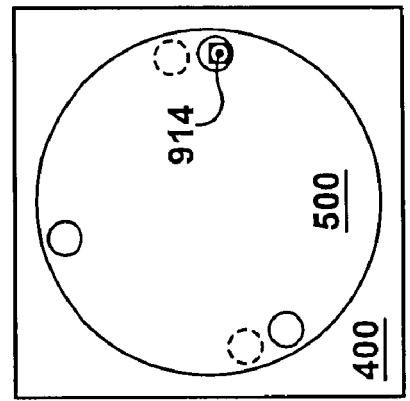
Figure 4D:
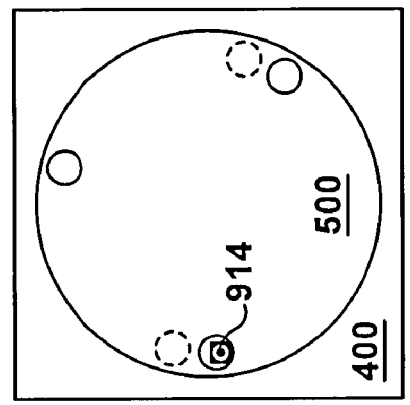
Figure 4C:
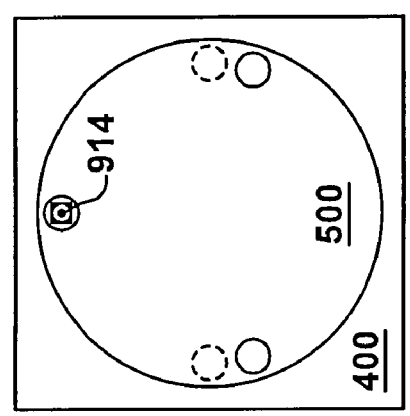
Figure 4G:
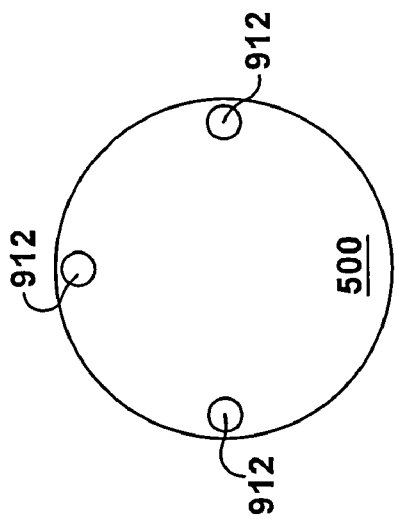
Figure 4F:
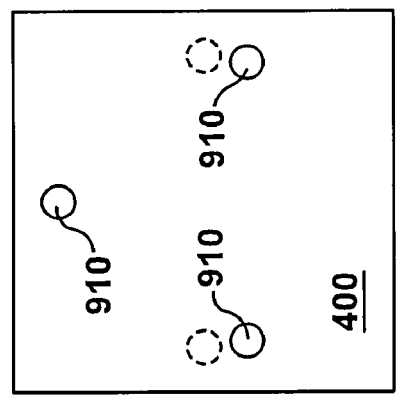
Figure 4J:
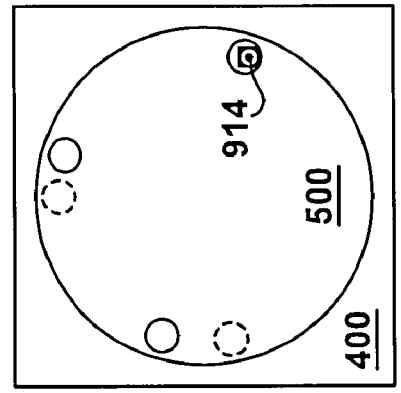
Figure 4I:
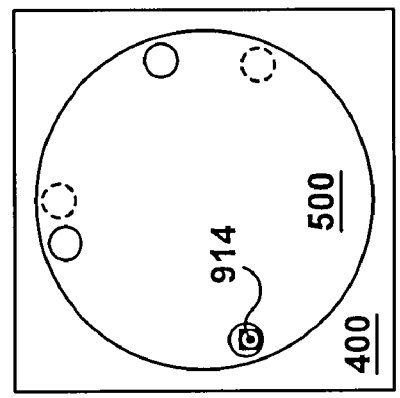
Figure 4H:
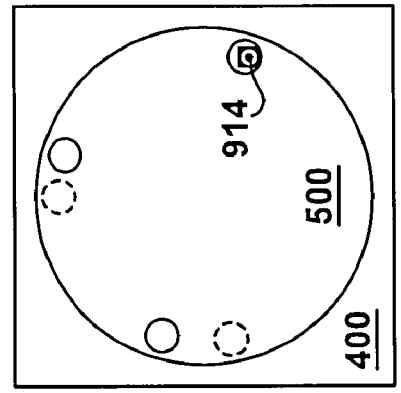

As graphed in FIG. 2, the relation between the spool position and valve flowrate preferably plots as a relatively smooth and convex curve (e.g., a parabola). The absence of flat regions in this curve (i.e., which would occur when the spool 610 pivots but flowrate does not change) can be an important design criteria in many valve applications. Slight leakage (e.g., 0.500 GMP) at the spool's IO position is usually necessary, and for the most part happily tolerated, in the interest of achieving this crucial objective.

Flow symmetry between the LIO spool positions and GIO spool positions insures that the minimum flow (i.e., the tolerated leakage) occurs at the IO spool position. In other words, the curve's vertex aligns with a spool pivot of 0° (see solid line in FIG. 2). But when flow symmetry is offset in the LIO direction (see dot-dash-dot line in FIG. 2) or offset in the GIO direction (see dash-dash line in FIG. 2), a greater-than-minimum leakage occurs at the 0° spool-pivot point. And, with such offsets, uphill compensations may not be as effective as downhill compensations, or vice-a-versa.

In the valve 100, the valve body 300, the spool assembly 600, and/or the pendulum assembly 700 include means for adjusting the flow symmetry between the LIO supply flowpaths and the GIO supply flowpaths.

As shown schematically in the third set of drawings, the spool rod 612 and the pendulum arm 712 can include elements 810 and 812 that can be selectively aligned to adjust the flow symmetry. For example, as shown in FIGS. 3A-3E, the spool rod 612 can have three slots 810, aligned precisely at the twelve-oclock, three-oclock, and nine-oclock locations. The pendulum arm 712 can also have three slots 812 with one slot being aligned precisely at the twelve-oclock location, and the other two slots being skewed from the three-oclock and nine-oclock locations.

If flow symmetry is acceptable (e.g., the solid line in FIG. 2), the spool-pendulum connection can be made with the twelve-oclock elements 810/812 aligned. For example, if the elements 810/812 are slots, a key 814 can be inserted through the aligned slots. When the twelve-oclock elements 810/812 are aligned, the three-oclock elements 810/812 are skewed and the nine-oclock elements 810/812 are skewed. (See FIG. 3C.)

If flow symmetry is offset in the LIO direction (e.g., the dash-dot-dash line in FIG. 2), the pendulum connection can be made with the nine-oclock elements 810/812 aligned, whereby the twelve-oclock elements are skewed and the nine-oclock elements are skewed. (See FIG. 3D.) And if flow symmetry is offset in the GIO direction (e.g., the dash-dash line in FIG. 2), the pendulum connection can be made with the three-oclock elements 810/812 aligned, whereby the twelve-oclock elements are skewed and the three-oclock elements are skewed. (See FIG. 3E.)

The alignment elements 810/812 can be arranged in a variety of fashions to achieve this effect. For example, the three-oclock and nine-oclock elements 810 can be skewed on the spool rod 612 and precisely aligned on the pendulum arm 712. (See FIGS. 3F-3J.) Furthermore, "oclock" locations, and/or diametrically opposed elements are not necessary. (See FIGS. 3K-3O.) And a one-to-one correspondence between spool and pendulum elements 810/812 is not necessary, as the pendulum assembly 700 can be rotated to a three-oclock or nine-oclock location for the alignment to be made. (See FIGS. 3P-3T.)

As shown schematically in the fourth set of drawings, the valve body 300 (e.g., the mounting plate 400 and the housing 500) can include elements 910 and 912 that can be selectively aligned to adjust the flow symmetry. For example, as shown in FIGS. 4A-4E, the mounting plate 400 can have three elements 910 aligned precisely at the twelve-oclock, three-oclock, and nine-oclock locations. The housing 500 can also have three elements 912 with one element being aligned precisely at the twelve-oclock location, and the other two elements being skewed from the three-oclock and nine-oclock locations. Or alternatively, the mounting plate 400 can have "skewed" elements 910 and the housing 500 can have "precise" elements 912. (See FIGS. 4F-4J.)

If flow symmetry is appropriate (e.g., the solid line in FIG. 2), the body parts 400/500 can be attached with the twelve-oclock elements 910/912 aligned. (See FIG. 4C and FIG. 4H.) For example, if the elements 910/912 are openings, a pin 914 can be inserted through the aligned openings. If flow symmetry is offset in the LIO direction (e.g., the dash-dot-dash line in FIG. 2) or in the GIO direction (e.g., the dash-dash line in FIG. 2), the attachment can be made with the nine-oclock/three-oclock elements aligned. (See FIG. 4D-4E and FIGS. 4I-4J.) As with the elements 810/812, when one pair of elements 910/912 is aligned, the other two can be skewed.

It should be noted that the skewed locations of the elements 810/812 and/or elements 820/822 may be somewhat exaggerated in the drawings for easy recognition. In actual practice, the skewing could be more slight as the objective will usually be to fine-tune the flow symmetry of the valve 100, rather than change its flow characteristics completely. For example, the elements could be skewed less than 5°, less than 3°, less than 2°, and/or less than 1° from the analogous "precise" location.

As shown schematically in the fifth set of drawings, the pendulum assembly 700 itself can incorporate flow-symmetry-adjusting means. For example, the pendulum's ballast 710 can comprise a coffer 720 having a canister 722 and a billet 724 within the canister 720. The billet 724 is securely emplaced within the coffer 720, but is also selectively movable to the left and to the right. In the illustrated pendulum assembly 700, for example, the canister 722 has internal threads and the billet 724 has external threads, so that the billet 724 will not shift unless specifically rotated by a screw-like tool. The left and/or right ends of the billet 724 can include a groove or other recess for receipt of the tip of such a tool.

Figure 5C:
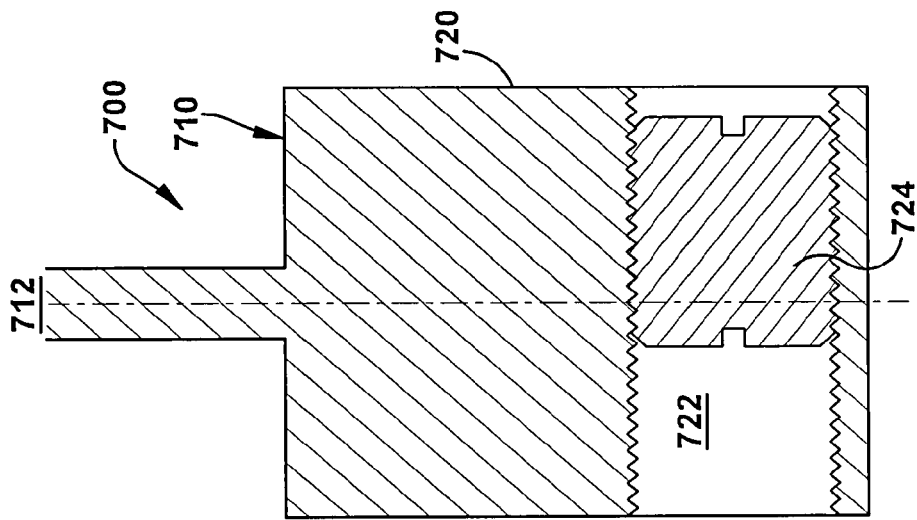
FIGS. 5A-5C are schematic illustrations of a pendulum assembly and flow-symmetry-adjusting means integrated thereinto.
Figure 5B:
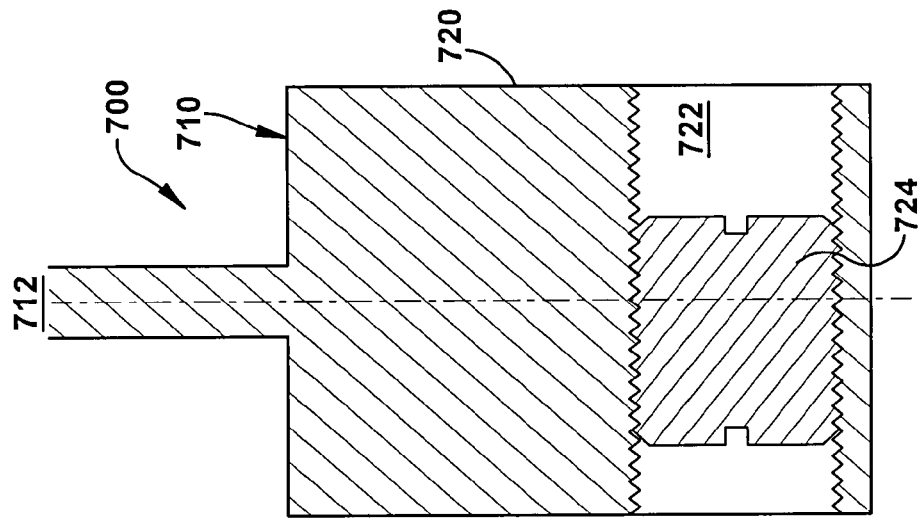
Figure 5A:
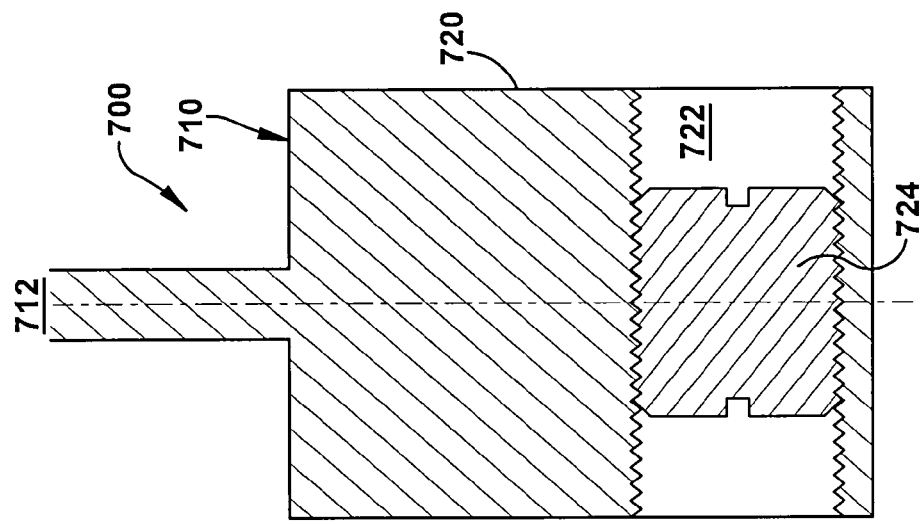

Movement of the billet 724 within the canister 720 serves to change the center-of-gravity of the pendulum assembly 700, and thus shift the flowrate curve in the corresponding direction. If the flow symmetry is balanced (e.g., the solid line in FIG. 2), the billet 724 can be centrally located relative to the coffer 720. (See FIG. 5A). If flow symmetry is offset in the LIO direction (e.g., the dash-dot line in FIG. 2) or in the GIO direction (e.g., dash-dash line in FIG. 2), the billet 724 can be slid left/right to compensate for this offset. (See FIGS. 5B-5C.)

The valve 100 can include one, some, or all of the above-discussed flow-symmetry-adjusting techniques (or equivalents thereof). In many instances, flow-symmetry adjusting steps can be performed by the valve manufacturer prior to shipping, to insure a balanced device is provided to a customer. But field adjusting steps are also possible and/or contemplated.

Figure 6:
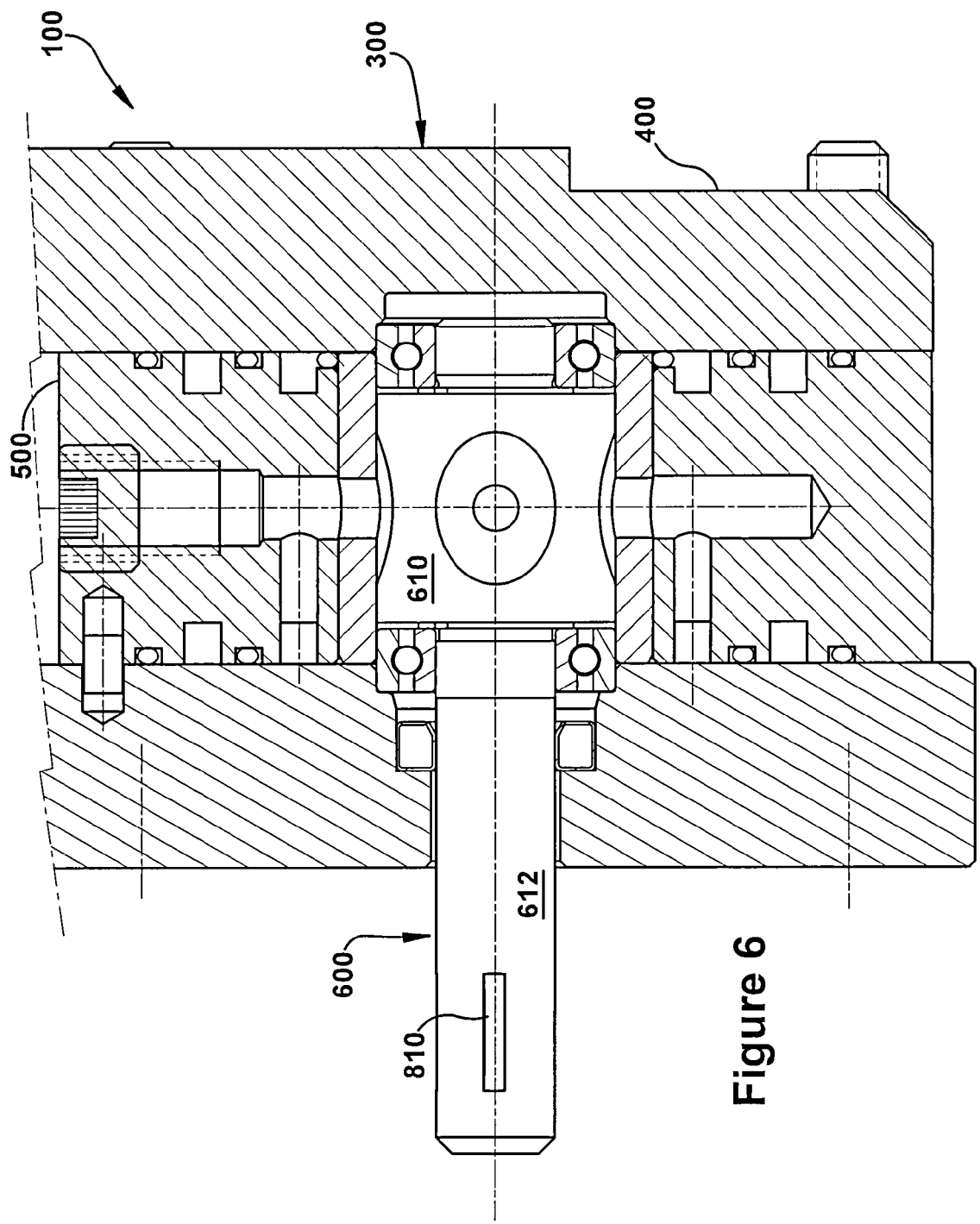
FIG. 6 is a sectional view of a valve body and a spool assembly for the valve.

FIG. 6 is a sectional view of a valve body 300 and a spool assembly 600 (e.g., the valve 100 without the pendulum assembly 700). With this valve design, the actuator 220 would have one intake/discharge line extending from its LIO side 230 to the valve 100 and one intake/discharge line extending from its GIO side 240 to the valve 100. And the pivot of the spool 610 in either the LIO direction or the GIO direction would determine whether the line introduced or discharged fluid from the cylinder side 230/240.

One may now appreciate that an incline-response valve 100 is provided wherein flow-symmetry adjustments can be made without the refabrication of flow-dictating features in the valve body 300 and/or the spool 610. Although the valve 100 and the flow-symmetry-adjusting means has been shown and described with respect to a certain embodiment or embodiments, it is obvious that equivalent alterations and modifications will occur to others skilled in the art upon the reading and understanding of this specification and the annexed drawings. In regard to the various functions performed by the above described elements (e.g., components, assemblies, systems, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A valve responsive to the incline of a supporting surface, said valve comprising:
    a valve body adapted for fixed attachment to a mounting surface having an orientation corresponding to the incline of the supporting surface, whereby the valve body assumes an orientation corresponding to the incline;
    a spool assembly comprising a spool pivotally mounted relative to the valve body;
    a pendulum assembly pivoting the spool in gravitational response to the orientation of the valve body to thereby situate the spool relative to the valve body among an IO position, sequential LIO positions whereat the valve body and the spool define enlarging LIO flowpaths, and sequential GIO positions whereat the valve body and the spool define enlarging GIO flowpaths;
    wherein at least one of the valve body, the spool assembly, and the pendulum assembly includes means for adjusting flow symmetry between the LIO flowpaths and the GIO flowpaths.

2. A valve as set forth in claim 1, wherein the spool situates in the IO position when the valve body has an orientation corresponding to the incline of the supporting surface being 0° relative to a reference horizontal line.

3. A valve as set forth in claim 2, wherein the spool situates in an LIO position when the valve body has an orientation corresponding to the incline of the supporting surface being less than 0° relative to the reference horizontal line; and wherein the spool situates in a GIO position when the valve body has an orientation corresponding to the incline of the supporting surface being greater than 0° relative to the reference horizontal line.

4. A valve as set forth in claim 2, wherein the valve body has a control-fluid-supply entrance, an LIO outlet, and a GIO outlet, and wherein:

when the spool is situated in the IO position, the LIO outlet and the GIO outlet are substantially sealed from the control-fluid-supply entrance;

when the spool is situated in a LIO position, an LIO supply flowpath is defined from the control-fluid-supply entrance to the LIO outlet; and when the spool is situated in a GIO position, a GIO supply flowpath is defined from the control-fluid-supply entrance to the GIO outlet.

5. A valve as set forth in claim 1, wherein the spool assembly and the pendulum assembly include the flow-symmetry-adjusting means.

6. A valve as set forth in claim 5, wherein the spool assembly comprises a spool rod having a distal end section and a proximate end section attached to the spool;

wherein the pendulum assembly comprises a ballast and an arm having an upper end section and a lower end section attached to the ballast;

wherein the distal end section of the spool rod is attached to the upper end section of the pendulum arm; and wherein, when an alignment element in the spool rod is aligned with an alignment element in the pendulum arm, two other alignment elements are skewed in the LIO and GIO directions, respectively.

7. A valve as set forth in claim 6, wherein at least some of the elements are slots and wherein a key is inserted through the aligned elements.

8. A valve as set forth in claim 6, wherein the skewed elements are skewed less than 5° to each other.

9. A valve as set forth in claim 1, wherein the valve body includes the flow-symmetry-adjusting means.

10. A valve as set forth in claim 9, wherein the valve body comprises a mounting part and a connection part, the mounting part being adapted for attachment to the mounting surface, the connection part being connected to the mounting part;

wherein the mounting part comprises a plurality of alignment elements including a mount-IO element, a mount-LIO element, and a mount-GIO element, and the connection part comprises a connect-IO element, a connect-LIO element, and a mount-LIO element; and wherein, when the mount-IO element and the connect-IO element are aligned with each other, the mount-LIO element and the connect-LIO element are slightly skewed to each other, and the mount-GIO element and the connect-GIO element are slighted skewed to each other.

11. A valve as set forth in claim 10, wherein, when the mount-LIO element and the connect-LIO element are aligned with each other, the mount-IO element and the connect-IO element are slightly skewed to each other; and when the mount-GIO element and the connect-GIO element are aligned with each other, the mount-IO element and the connect-IO element are slightly skewed to each other.

12. A valve as set forth in claim 10, wherein, when the mount-LIO element and the connect-LIO element are aligned with each other, the mount-GIO element and the connect-GIO element are slightly skewed to each other; and when the mount-GIO element and the connect-GIO element are aligned with each other, the mount-LIO element and the connect-LIO element are slightly skewed to each other.

13. A valve as set forth in claim 10, wherein the aligned elements are openings and wherein a pin is inserted through the aligned openings.

14. A valve as set forth in claim 10, wherein the non-aligned elements are skewed less than 5° to each other.

15. A valve as set forth in claim 10, wherein the mounting part is a mounting plate, and wherein the connection part is a housing having a spool chamber in which the spool is pivotally situated.

16. A valve as set forth in claim 1, wherein the pendulum assembly includes the flow-symmetry-adjusting means.

17. A valve as set forth in claim 16, wherein the pendulum assembly includes a pendulum arm and a ballast;

the pendulum arm having an upper end section connected to the spool assembly and a lower end section attached to the ballast;

the ballast having a coffer with a canister and a billet selectively shiftable within the canister to alter the center of gravity of the pendulum assembly.

18. A valve as set forth in claim 17, wherein the canister has internal threads and the billet has external threads that engage therewith.

19. A valve as set forth in claim 1, wherein a subject structure supported on a supporting surface, and a mounting surface having an orientation corresponding to the incline of the supporting surface, wherein the valve body is fixedly attached to the mounting surface.

20. A valve as set forth in claim 1, wherein a subject structure, and an actuator operably levered to the subject structure and fluidly connected to the valve so that:

when the spool is situated in an LIO position, control fluid is provided to the actuator to move at least a portion of the subject structure for a distance proportional to the flowrate of the corresponding LIO flowpath; and when the spool is situated in a GIO position, control fluid is provided to the actuator to move at least a portion of the subject structure for a distance proportional to the flowrate of the corresponding GIO flowpath.

* * * * *